(No Model.)

L. R. LANTZ.
BALE TIE.

No. 430,864.

Patented June 24, 1890.

Witnesses:
E. P. Ellis
L. J. Magie

Inventor:
L. R. Lantz,
per
F. A. Lehmann,
atty.

UNITED STATES PATENT OFFICE.

LESTER R. LANTZ, OF NEW ALBANY, PENNSYLVANIA.

BALE-TIE.

SPECIFICATION forming part of Letters Patent No. 430,864, dated June 24, 1890.

Application filed December 7, 1889. Serial No. 332,881. (No model.)

*To all whom it may concern:*

Be it known that I, LESTER R. LANTZ, of New Albany, in the county of Bradford and State of Pennsylvania, have invented certain new and useful Improvements in Wire Bale-Ties; and I do hereby declare the following to be a full, clear, and exact description of the invention, such as will enable others skilled in the art to which it pertains to make and use it, reference being had to the accompanying drawings, which form part of this specification.

My invention relates to an improvement in bale-ties; and it consists in the particular construction hereinafter described, and pointed out in the claims.

The object of my invention is to provide a wire bale-tie which is specially intended for use upon bales of hay, and which will automatically lock itself after the plate has been passed through the loop, and in such a manner that it is impossible for it to become accidentally unfastened.

Figure 1:
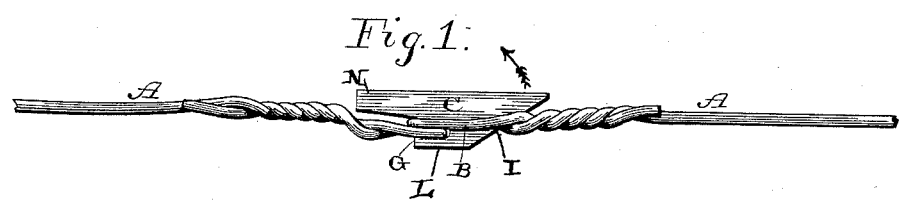
Figure 2:
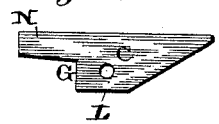

Figure 1 is a side elevation of a bale-tie which embodies my invention, the ends of the wire being shown as fastened together. Fig. 2 is a side view of the fastening-plate alone.

A represents the wire, which is provided with a loop B at one end in the usual manner. This plate C is made of the shape shown and is provided with an opening at or near its center, in which one end of the wire is fastened. The lower front corner of this plate is beveled away, so as to form a point, as shown, and the lower rear corner is cut away, so as to form a shoulder G, behind which the loop B catches. This fastening-plate, being pivoted at or near its center, turns freely upon the wire, and when the plate is moved into a line with the end of the wire to which it is fastened and passed through the loop B on the other end of the wire the plate at once turns upon the wire just sufficiently to raise the shoulder at such an angle that it stands directly across the loop, and thus not only makes the device automatic in its operation, but causes the plate to assume such a position that it is almost impossible for it to become accidentally unfastened. This turning upon its pivot is very necessary for the plate, because by this means the rear end of the plate is caused to tilt up, so as to engage with the loop without any care or attention on the part of the operator. If the plate does not tilt and if a shoulder is not formed upon its rear end, the plate and the loop will not automatically engage.

Heretofore fastening-plates of different kinds have been used, and some of them have been provided with cuts or slots in one or both of their edges; but these devices are impracticable for the reason that the operator must guide the loop into the slots or notches, and this requires too much time and trouble. They are also impracticable for the reason that the loop is so large as compared to the size of the fastening-plate that but a slight slackening of the wire will allow the plate to pass through the loop, and this not being discovered until the bale is removed from the press necessitates the replacing of the bale in the press again before the plate can be passed through the loop. Where, however, the aperture is made near the center of the plate for the loop of one end of the wire and the distance from the engaging-point I upon the incline of the detachable loop B to the aperture less than the distance from the said aperture to the rear end of the projection, it makes it practically impossible for the plate to become accidentally detached from the loop B from even extraordinary slackage of the wire.

Another peculiarity of my plate as compared with others is that the incline only extends backward about one-third the distance of the length of the plate, so that a straight portion L is formed, and by making the projection N longer than the distance from the point I to the junction of the incline and the straight part L the loop will not pass backward far enough to allow the plate to pass through the said loop from ordinary slackage of the wire.

Another peculiarity of my plate is in making the lower edge of the projection N substantially parallel with its upper edge and with the wire below it, as shown, and placing the aperture in the rear of the incline about the center of the plate, which makes it very sensitive to backward tilting in the direction indicated by arrow when the wire is slackened from either end, and this forces the projection down upon the loop B and the stationary end of the wire and forms a lock to prevent further movement of the loop B, no matter how slack the wire may become. A device of this nature to be practicable must automatically lock itself after the plate has been passed through the loop. After the fastening has been effected the plate bears directly upon the loop both at the shoulder and at the opposite point, and it is thus held in a direct line with the wire, so that only a direct pull is exerted upon it.

Having thus described my invention, I claim—

1. A bale-tie consisting of a plate having an incline at one end, a vertical shoulder at the opposite end, and a longitudinal projection above the said shoulder having a lower edge substantially parallel with its upper edge, an aperture in the plate about the center of its length and below the lower edge of the said projection, and a wire having one end secured in the aperture and its opposite end provided with a loop which engages the shoulder and the incline, whereby a slackening of the wire tilts the plate and locks the movable loop, substantially as shown and described.

2. A bale-tie consisting of a plate having an incline at one end, a shoulder at its opposite end, a projection above the said shoulder, and an aperture in the plate between the shoulder and the incline, and a wire having one end secured in the aperture and its opposite end provided with a loop which engages the incline and the shoulder, the projection being longer than the distance between the aperture and point of engagement of the removable loop upon the incline, whereby the loop is prevented from becoming detached when the wire is slack, substantially as shown and described.

In testimony whereof I affix my signature in presence of two witnesses.

L. R. LANTZ.

Witnesses:
F. A. LEHMANN,
PHILIP MAURO.